United States Patent [19]

Herrington

[11] Patent Number: 4,654,021
[45] Date of Patent: Mar. 31, 1987

[54] MAKING INTERMITTENT ORIENTATION DRAW TAPE FOR BAGS

[75] Inventor: Fox J. Herrington, Holcomb, N.Y.

[73] Assignee: Mobil Oil Corporation, New York, N.Y.

[21] Appl. No.: 792,377

[22] Filed: Oct. 29, 1985

[51] Int. Cl.⁴ ............................................. B31B 1/00
[52] U.S. Cl. ..................... 493/211; 264/167;
  264/288.4; 264/289.3; 264/290.5; 493/225;
  493/338; 493/928
[58] Field of Search .............. 493/211, 338, 339, 225,
  493/928; 264/167, 289.3, 290.5, 288.4; 165/89;
  28/243

[56] References Cited

U.S. PATENT DOCUMENTS

| | | | |
|---|---|---|---|
| 1,675,274 | 6/1978 | Miller | 165/89 |
| 2,131,336 | 9/1938 | Sullivan | 165/89 |
| 3,029,853 | 4/1962 | Piazze | 383/75 |
| 3,069,726 | 12/1962 | Adams | 264/289.3 |
| 3,444,682 | 5/1969 | Polacco et al. | 264/167 |
| 3,903,961 | 9/1975 | Stanislaw | 165/89 |
| 4,034,055 | 7/1977 | Strutzel et al. | 264/290.5 |

FOREIGN PATENT DOCUMENTS 1125363 8/1968 United Kingdom .

Primary Examiner—Frederick R. Schmidt
Assistant Examiner—Robert Showalter
Attorney, Agent, or Firm—Alexander J. McKillop; Michael G. Gilman; Charles J. Speciale

[57] ABSTRACT

A thermoplastic draw tape for bags is produced by stretching thermoplastic between a first pair of nip rollers running at a relatively slow speed and a second pair of nip rollers running at a higher speed. A rotating cylinder has hot and cool sections spaced around the circumference. The draw tape is heated in intermittent sections which are stretched as they pass through the nip rolls to produce a relatively thin and narrow central portion between end portions which pass over the cool sections of the rotating cylinder.

10 Claims, 6 Drawing Figures

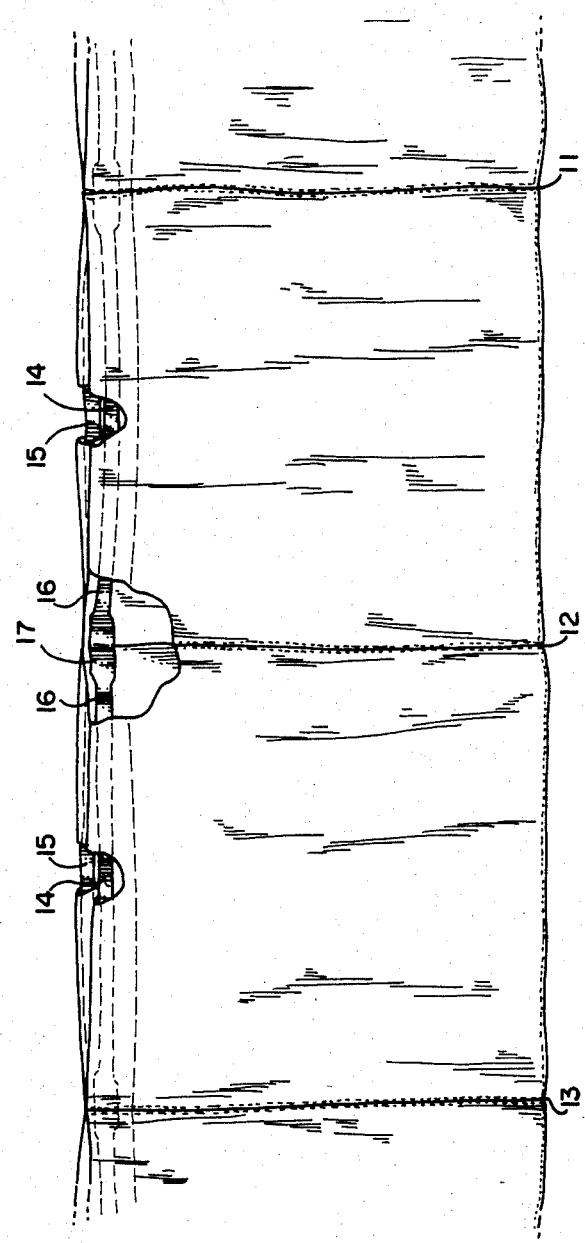
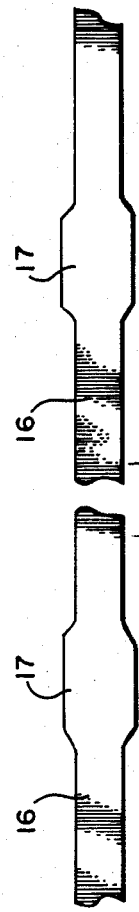

MAKING INTERMITTENT ORIENTATION DRAW TAPE FOR BAGS

BACKGROUND OF THE INVENTION

This invention relates to the manufacture of draw tape for thermoplastic bags, and more particularly, to making an intermittently stretched and oriented draw tape.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Patent No. 1,125,363—Jortikka are examples of draw tape bags. Such closures have been successfully employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

As more fully set forth in the Herrington application identified below, an improved draw tape for trash bags of this type has a stretched relatively thin central portion between unstretched, relatively thick and wide end portions of the tape. The end portions are heat sealed at the sides of the bag. This stretched tape has an economic advantage and improved load carrying characteristics.

It is an object of the present invention to provide a method of and apparatus for intermittently stretching thermoplastic tape to produce such draw tapes for bags.

It is another object of the present invention to provide tape stretching apparatus with mechanical simplicity and no reciprocating parts.

It is another object of the present invention to do away with the requirement for an oven to heat the tape prior to stretching.

RELATED APPLICATIONS

"METHOD & APPARATUS FOR MANUFACTURING DRAW TAPE BAGS", Boyd, et al, Ser. No. 652,254, filed Sept. 20, 1984 describes an overall draw tape bag manufacturing line; "METHOD & APPARATUS FOR FORMING HEMS IN SUPERPOSED PLIABLE PANELS", Boyd et al, Ser. No. 652,255, filed Sept. 20, 1984, describes a hem forming apparatus used with the line; "INSERTION OF DRAW TAPE STRIPS IN DRAW TAPE BAG MANUFACTURE", Boyd, et al, Ser. No. 652,252, filed Sept. 20, 1984, describes the apparatus for inserting the draw tape into the bag. "BAG HAVING INTERMITTENT ORIENTATION DRAW TAPE", Herrington, Ser. No. 722,045, filed April 11, 1985. describes an intermittently oriented draw tape. The foregoing applications are incorporated herein by reference.

SUMMARY OF THE INVENTION

In accordance with the present invention, thermoplastic tape is intermittently stretched and oriented by two pairs of nip rolls, the first of which includes a cylinder which has hot and cold segments so that when the tape leaves it, there are regions of different temperatures with different resistances to stretching.

The first pair of nip rollers runs at a relatively slow speed and the second pair at a higher speed, so that the intermittent heated portions of the tape are stretched to produce relatively thin and narrow portions of the tape. The portions which pass through the cool sections of the rotating cylinder are unstretched, thereby producing relatively thick and wide end portions of the tape.

The draw tape is inserted into the hem of a bag and the thick and wide end portions of the tape are heat sealed at the sides of each bag. In this manner, stretched, oriented, tape forms the bag carrying handle, but the tape is heat sealed in unstretched, unoriented, portions of the tape. The apparatus of the present invention is easily synchronized with the bag making apparatus which includes means for slitting a tube of extruded polyethylene, forming a hem in the continuous length of film, inserting the draw tape into the hem, heat sealing the tape and the sides of the bag and severing the continuous length of film into individual bags.

The present invention has the added advantages of mechanical simplicity with no reciprocating parts. No oven is required. The spacing between the nip rolls is relatively long, so there is no constraint on the diameter on the heating/cooling cylinder. The apparatus is easily synchronized with the bag making apparatus.

The foregoing and other objects, features, and advantages will be better understood from the following more detailed description and appended claims.

SHORT DESCRIPTION OF THE DRAWINGS

FIGS. 1 and 1A show a series of bags with the draw tape made in accordance with the present invention;

DESCRIPTION OF THE PREFERRED EMBODIMENT

FIG. 1 shows bags for carrying trash. They include two panels which are formed from an extruded tube of polyethylene. The sides of the panels are heat sealed and cut from the tube at 11, 12 and 13 in a perpendicular direction. The tube is slit along one side to form open tops in the bag for reception of trash and the like. Hem portions of each panel are folded over adjacent the top. Draw tapes 14 and 15 are secured by the heat seal at the sides of the panels. A cut-out in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

The draw tape has a relatively thin and narrow central portion 16 of stretched, oriented, polyethylene and end portions 17 at the extremities. The relatively thick and wide end portions are unstretched, unoriented, polyethylene tape. The heat seal which secures the draw tape to the sides of the panels is through the relatively thick and wide end portions.

Figure 2:
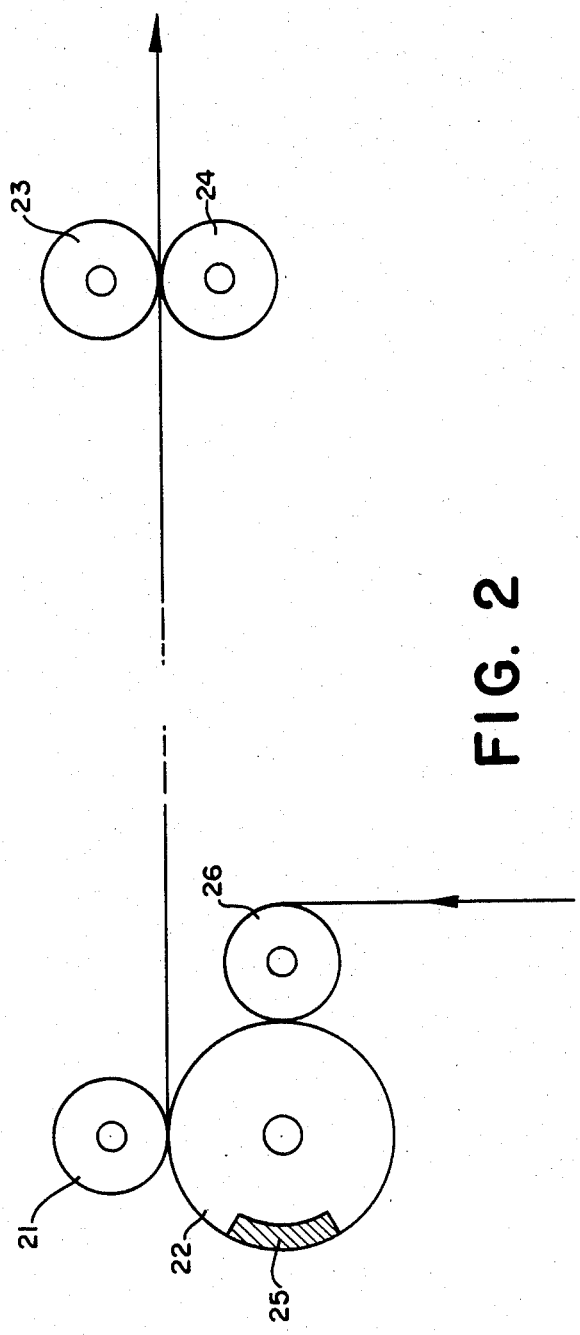
FIG. 2 is a side view of the two pairs of nip rollers used to stretch the tape in accordance with the present invention.

Referring to FIG. 2, the apparatus for producing draw tape just described includes a first pair of nip rollers including roller 21 and rotating cylinder 22. A second pair of nip rollers 23 and 24 runs at a higher speed so that heated tape between them is stretched. In an exemplary embodiment, the first pair of nip rollers is rotating at 75 ft. per min. and the second pair at 300 ft. per min.

The rotating cylinder 22 has hot and relatively cool sections spaced around the circumference thereof. The section 25 is a cool section, for example, at ambient temperature, whereas the remainder of the circumference of cylinder 22 is a heated section, for example, being heated to 240° F.

Incoming tape passes between cylinder 22 and roller 26. It is heated as it comes in contact with the heated sections of cylinder 22. The heated portions of the tape are stretched as they pass between the first and second pairs of nip rolls. The portions of the tape which pass over the cool section 25 are not stretched.

The circumference of cylinder 22 is equal to the length of tape required for each bag before it is stretched, or a circumference equal to an integral multiple of the required length of tape prior to stretching and orientation.

For example, for a tape having a 2″ end portion every 30 inches (for a 30″ wide bag), with a stretch ratio of 5-to-1 for the 28″ long portions, the tape length prior to orientation will be 7.6″ (2″ for the end portion and 1/5 of 28″ for the portion to be stretched). Every 7.6″ of the circumference has 2″ of cold surface, then 5.6″ of hot surface. The un-oriented tape leaving this nip roll has segments that are different temperatures, 2″ cold, then 5.6″ hot, then 2″ cold, etc. After leaving the slow pair of nip rollers, the tape is then pulled away, by the second set of nip rolls, at a faster speed, moving faster than the first at a ratio of 30 to 7.6, or about 4-to-1. Only hot portions of the tape will be stretched.

It is desirable that the spacing between the nip rolls be such that there will always be exactly one of the 2″ cold segments within that space at any one time, so there will always be the same amount of tape being actively stretched. It is necessary to enclose the tape as it is being stretched, so the hot parts, which rapidly become thin, do not cool off quickly and become strong and transfer the stretch to the cold parts.

An advantage of the invention is its mechanical simplicity. There are no reciprocating parts. No oven is required, since the infeed cylinder is in contact with the tape and is capable of heating as required. To obtain more heating time, the roll circumference can be increased, as long as it is done in increments of the repeat length. Unlike other systems, the spacing between the nips is relatively long, so there is no constraint on the diameter of the heating-cooling roll.

Figure 3:
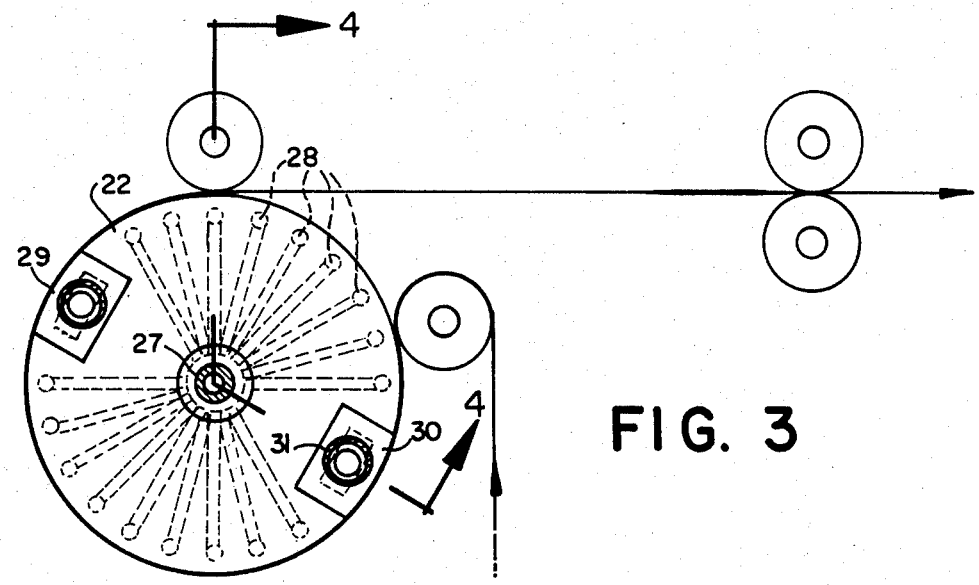
FIG. 3, shows an oil heated cylinder.
Figure 4:
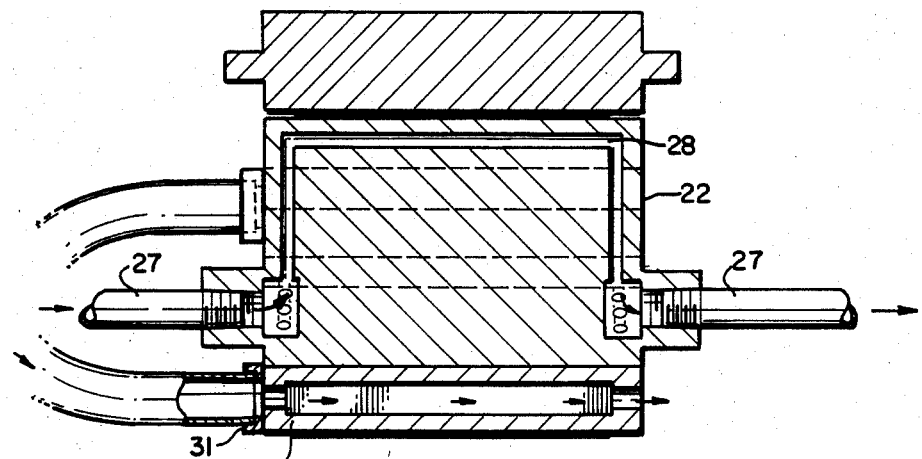
FIG. 4 is a section on the lines 4—4 of FIG. 3.

One way of heating and cooling the circumferential sections of the cylinder is by oil and cooling air as shown in FIGS. 3 and 4. Oil enters the rotating cylinder 22 through the inlet 27. It circulates through passages such as 28 to heat the major portion of the cylinder 22. Hollow inserts 29 and 30 in cylinder 22 form the cool sections. These inserts 29 and 30 are cooled by passing air through them from the plenum 31. Air is fed to the stationary plenum 31 that slides against the side of the cylinder 22 over the openings to inserts 29 and 30.

Figure 5:
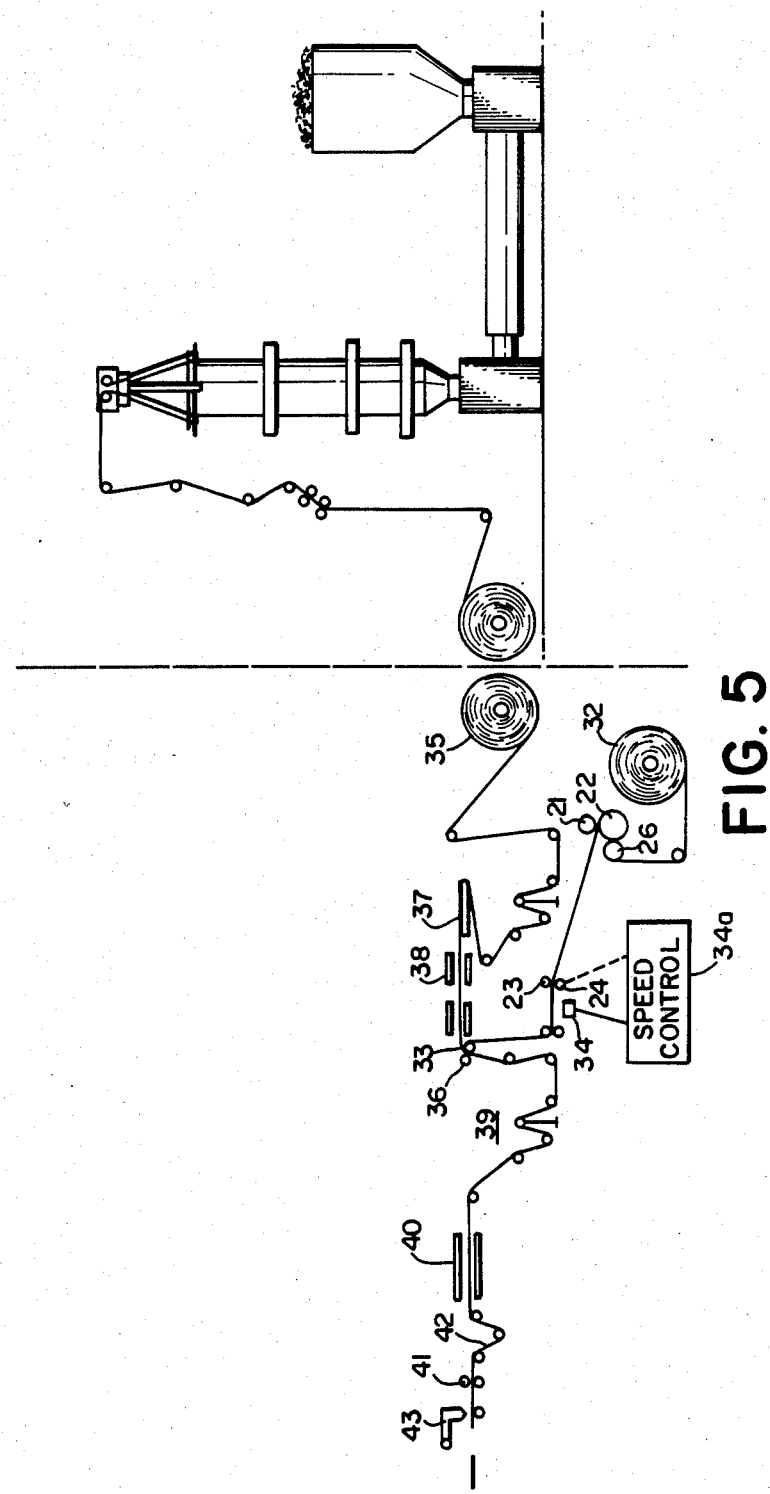
FIG. 5 depicts a manufacturing line for the bags which includes the apparatus of the present invention for intermittently stretching the draw tape prior to insertion into the bags.

FIG. 5 shows the apparatus of the present invention with bag making machinery. Polyethylene tape from the roll 32 is intermittently stretched by the first pair of nip rollers 21 and 22, and by the second pair of nip rollers 23 and 24.

The stretched tape is fed into the tape inserter 33, where it is inserted into the hem of a continuously moving line of bags. In order to operate the tape stretching apparatus of the present invention in line with this bag making apparatus, it is necessary to synchronize the tape stretcher with the bag machine in two respects:

1. Cyclic register: There must be exactly one interruption for every cycle of the bag machine. This can be done by driving the hot-and-cold cylinder 22 relative to the bag machine crank, so the roll makes one rotation for an integral number of cycles of the bag machine, that integral ratio being equal to the number of repeats on the circumference of the roll.

2. Linear speed match: The linear speed of the exiting oriented tape must be the same as the speed of the film entering the bag machine, in order to match tensions. This can be done by sensing the tension of the tape leaving the orienter with sensor 34. Sensor 34 acts through speed control 34a to adjust the speed of the exit nips 23 and 24 to maintain the tension at a desired level. This will result in slight changes in the amount of stretch.

The remainder of the line for producing draw tape bags shown in FIG. 5 is more fully described in the aforementioned applications. Briefly, a roll 35 feeds a continuous, extruded tube of polyethylene which has been slit and folded along a median longitudinal line. The material is drawn from the roll 35 by pinch rollers 36. These draw the folded film, forming the two opposing panels, through a hemmer 37 and through a punch 38 which forms the cut-outs in each panel. The continuous line of bags passes through the tape inserter 33 where the draw tape from the stretching apparatus of the present invention is inserted into each hem of the bag.

The continuous length of film with the draw tapes inserted in the hem thereof is advanced from the pinch rollers 36, through rollers 39 and a hem sealer 40, by means of a second pair of pinch rollers 41. As the length of continuous hem sealed film exits the hem sealer 40, it passes through a set of dancer rolls 42, to the seal cutter assembly 43. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. Apparatus for forming a thermoplastic draw tape having thick and wide end portions with a relatively thin and narrow central portion between said end portions in combination with bag making machinery comprising a first pair of nip rollers in said apparatus adapted for running at a relatively slow speed, said first pair of nip rollers including a rotating cylinder having hot and relatively cool sections spaced around the circumference thereof, means for feeding draw tape to said first pair of nip rollers to heat said tape in intermittent heated and cool portions as it passes through said first pair of nip rollers, a second pair of nip rollers in said apparatus adapted for running at a higher speed than said first pair and spaced therefrom to receive said tape from said first pair of nip rollers, said tape being stretched in said heated portions by said second pair of nip rollers running at said higher speed to produce said relatively thin and narrow central portions between said end portions which pass through the cool sections of said rotating cylinder, and bag making machinery associated with said apparatus including means for inserting said draw tape into a folded hem of a continuous line of bags, and means for heat sealing said tape to the sides of each bag through said thick and wide end portions of said draw tape.

2. The apparatus recited in claim 1 wherein the circumferential length of each heated section of said cylinder is equal to the unstretched length of the central portion of said tape.

3. The apparatus recited in claim 2 wherein the circumferential length of each cool section of said cylinder is equal to the length of the end portions of said draw tape.

4. The apparatus recited in claim 3 wherein the total circumference of said cylinder is equal to a multiple of the unstretched length of said tape.

5. The apparatus recited in claim 3 wherein the spacing between said first and second nip rolls is such that there is only one cool portion of said tape between them at any one time.

6. The apparatus recited in claim 1 wherein said nip rolls are driven in synchronism with said bag making machinery.

7. The apparatus recited in claim 6 wherein said relatively cool sections of said cylinder include hollow inserts; and means connecting with said hollow inserts for supplying cooling air to said hollow inserts.

8. The apparatus recited in claim 1 wherein said rotating cylinder has passages beneath the hot sections thereof; and means connected to said passages for supplying hot oil to said passages to heat said cylinder.

9. The method of making thermoplastic bags having a thermoplastic draw tape having a relatively thin and narrow central portion between thick and wide end portions comprising:

passing said tape between a first pair of nip rollers running at a relatively slow speed and a second pair of nip rollers running at a higher speed;

heating a section of one of said first pair of nip rollers to produce intermittent heated and cool portions of said tape as it passes through said first pair of nip rollers, said tape being stretched in said heated portions to produce said relatively thin and narrow portion between end portions which pass over cooler sections of said rotating cylinder;

inserting said draw tape into a folded hem of a continuous line of thermoplastic bags; and heat sealing said tape to the sides of each bag, through said thick and wide end portions of said tape.

10. The method recited in claim 9 further comprising: rotating said nip rolls in synchronism with the apparatus for making said bags.

* * * * *